(No Model.)

A. B. MOUCK.
HARVESTER.

No. 325,266. Patented Sept. 1, 1885.

Witnesses:
W. L. Miles.
P. H. Middlekauff.

Inventor:
Andrew B. Mouck.
By his Atty
P. F. Steward

United States Patent Office.

ANDREW B. MOUCK, OF FARGO, DAKOTA TERRITORY, ASSIGNOR OF ONE-HALF TO WILLIAM DEERING, OF CHICAGO, ILLINOIS.

HARVESTER.

SPECIFICATION forming part of Letters Patent No. 325,266, dated September 1, 1885.

Application filed December 5, 1884. (No model.)

*To all whom it may concern:*

Be it known that I, ANDREW B. MOUCK, of Fargo, in the county of Cass and Territory of Dakota, have invented a new and useful Improvement in Harvesters, of which the following is a full description, reference being had to the accompanying drawings.

My invention relates to that class of harvesters in which endless belts are used to deliver the cut grain to binding mechanism; and it consists of an arrangement by which a spring or springs is or are made to keep the delivery-belt at all times tight.

Figure 1:
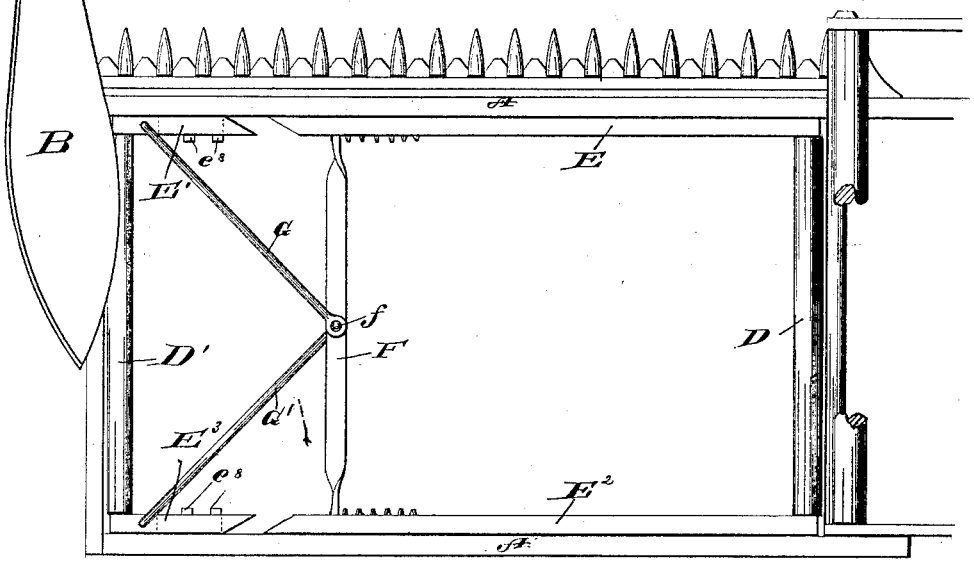
Figure 2:
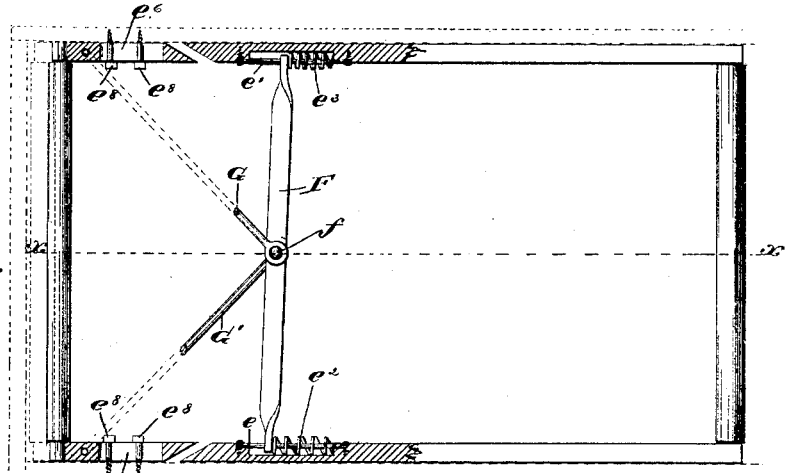
Figure 3:
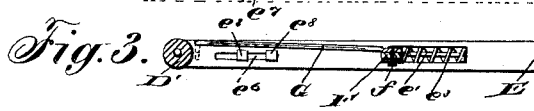

In the drawings, Figure 1 is a plan view of the platform of a harvester with the delivery-apron removed. Fig. 2 is a plan view of those parts constituting my invention, shown partly in section. Fig. 3 is a rear sectional view of the same parts as if cut on the line $x$ $x$ of Fig. 2.

A is the front platform-sill. To this the cutting apparatus is attached. A' is the rear platform-sill. B is the grain-divider. D is the apron-driving roller. D' is a roller at the grain end of the platform around which the apron is drawn.

E is a portion of the apron-frame, which is secured to the front platform-sill. $E^2$ is a similar piece secured to the rear platform-sill. Into these the roller D is journaled.

E' and $E^3$ are short sections of apron-frame secured to the respective sills by means of the screws $e^5$, passing through the slots $e^6$ and $e^7$. The roller D' is journaled in these frame-pieces, and they, by the slotting, being permitted to move endwise, the distance between the rollers D and D' may be varied.

$e$ and $e'$ are guide-rods let into the pieces E and $E^2$, which are recessed to receive the springs $e^2$ and $e^3$.

F is a bar reaching from front to rear of the platform, having eyes at either end through which the rods $e$ and $e'$ pass. G and G' are brace-rods pivoted to the bar F at $f$, their other ends reaching to the short frame-pieces E' and $E^3$. The springs are adapted to move the bar F grainward, and thus, through the braces and the short frame-pieces E' and $E^3$, to move the roller D' in the same direction. By this arrangement the apron, when drawn around the rollers in the usual manner, is, by the elasticity of the springs, kept taut.

I am aware that it is not new to use springs for the purpose of keeping harvester-aprons taut, it being a common practice to provide a spring to carry each end of the roller independent of the other.

By the use of the bar F and the braces G and G', whatever force is exerted to move the bar, each end of the roller is moved an equal distance and the parallelism of the rollers is not affected.

Should one of the springs become weak or altogether useless, the device would still be operative, as the effectiveness depends, not upon the position to which the ends of the bar are moved, but upon the position to which its middle at $f$ is moved.

What I claim is—

1. The rollers D and D', the latter supported in bearings adapted to be moved so as to increase the distance between the said rollers, the elastically-supported bar F, and the braces G and G', pivoted to the said bar and secured to said bearings, all arranged and combined substantially as described.

2. The rollers D and D', the short frame-pieces E' and $E^3$, the roller D' journaled therein, the braces G and G', the bar F, the guide-rods $e$ and $e'$, and the springs $e^2$ and $e^3$, all combined substantially as and for the purpose set forth.

ANDREW B. MOUCK.

Witnesses:
JOHN D. BATSON,
L. W. SCHRUTH.